Feb. 13, 1962

C. B. CURRIE ETAL 3,020,921

MANIFOLD VALVE

Filed Dec. 4, 1958

INVENTORS
COURTLAND B. CURRIE
HUGH M. MORGAN

BY Alan M. Staubly

ATTORNEY

Feb. 13, 1962  C. B. CURRIE ETAL  3,020,921
MANIFOLD VALVE
Filed Dec. 4, 1958  4 Sheets-Sheet 2

INVENTORS
COURTLAND B. CURRIE
HUGH M. MORGAN
BY
*Alan M. Stanley*
ATTORNEY

Feb. 13, 1962 C. B. CURRIE ET AL 3,020,921
MANIFOLD VALVE
Filed Dec. 4, 1958 4 Sheets-Sheet 3

INVENTORS
COURTLAND B. CURRIE
HUGH M. MORGAN
BY
*Alan M. Staubly*
ATTORNEY

Feb. 13, 1962 C. B. CURRIE ETAL 3,020,921
MANIFOLD VALVE
Filed Dec. 4, 1958 4 Sheets-Sheet 4
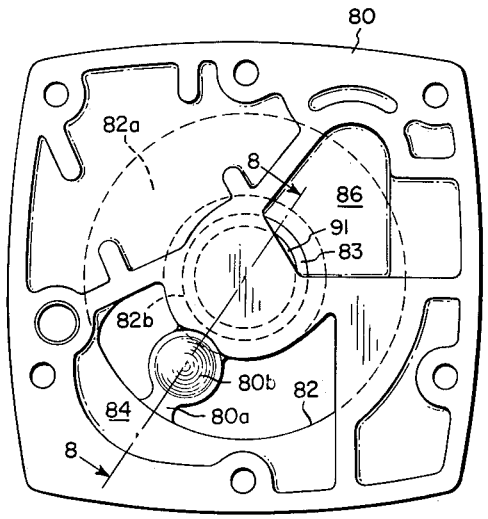
Fig. 7
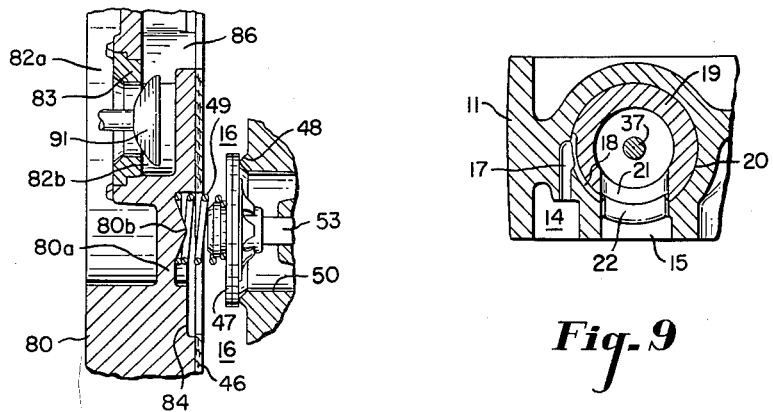
Fig. 8
Fig. 9
INVENTORS
COURTLAND B. CURRIE
HUGH M. MORGAN
BY
*Alan M. Staubly*
ATTORNEY United States Patent Office 3,020,921
Patented Feb. 13, 1962

3,020,921
MANIFOLD VALVE
Courtland B. Currie, Los Angeles, and Hugh M. Morgan, Culver City, Calif., assignors to Minneapolis-Honeywell Regulator Company, Minneapolis, Minn., a corporation of Delaware
Filed Dec. 4, 1958, Ser. No. 778,102
4 Claims. (Cl. 137—66)

This invention is concerned with manifold valves for use in controlling the flow of gas to a heater and, more particularly, it is concerned with the provision of a combination manually operated valve, thermocouple controlled or powered safety valve, and thermostatic valve, which may selectively be used as described or in combination with a pressure regulator positioned over the other valves and in the gas flow stream between the manually operable valve and the thermostatic valve. The invention is further directed to a structural arrangement which prevents accidental turning on and off of the gas controlled by the valve.

One of the objects of this invention is to provide a very compact valve of the above described type which makes it particularly useful in combination with space heaters, where the size of the control is an important factor.

Another object of the invention is to provide a manifold valve having a safety valve, manually operable valve and thermostatic valve with fluid flow passages therein connecting said valves in that order of fluid flow, and having means that may be removably added to the passage between the manually operable valve and the thermostatic valve to enable a pressure regulator valve to be added thereto so as to have gas flow from the manually operable valve and pass through the regulator valve to reach the thermostatic valve.

Still another object of the invention is to make a manifold valve of such configuration that a pressure regulator body section may be added thereto without increasing the vertical and horizontal dimensions thereof but only the thickness thereof.

Another object of the invention is to provide a manifold valve including a safety pilot valve and a plug valve in a combination wherein a pointer for indicating the position of the plug valve serves the dual function of a stop to prevent accidental turning on and off of the gas.

Still further objects of the invention will become apparent upon reading the following detailed description of the invention in conjunction with the accompanying drawing wherein:

FIGURE 7 is an elevational view of one side of the pressure regulator section of the manifold valve, taken along line 7—7 of FIGURE 3;

FIGURE 8 is a cross-sectional view of a portion of the pressure regulator section, taken along line 8—8 of FIGURE 7; and FIGURE 9 is a cross-sectional view of a portion of the plug valve, taken along line 9—9 of FIGURE 1.

Figure 1:
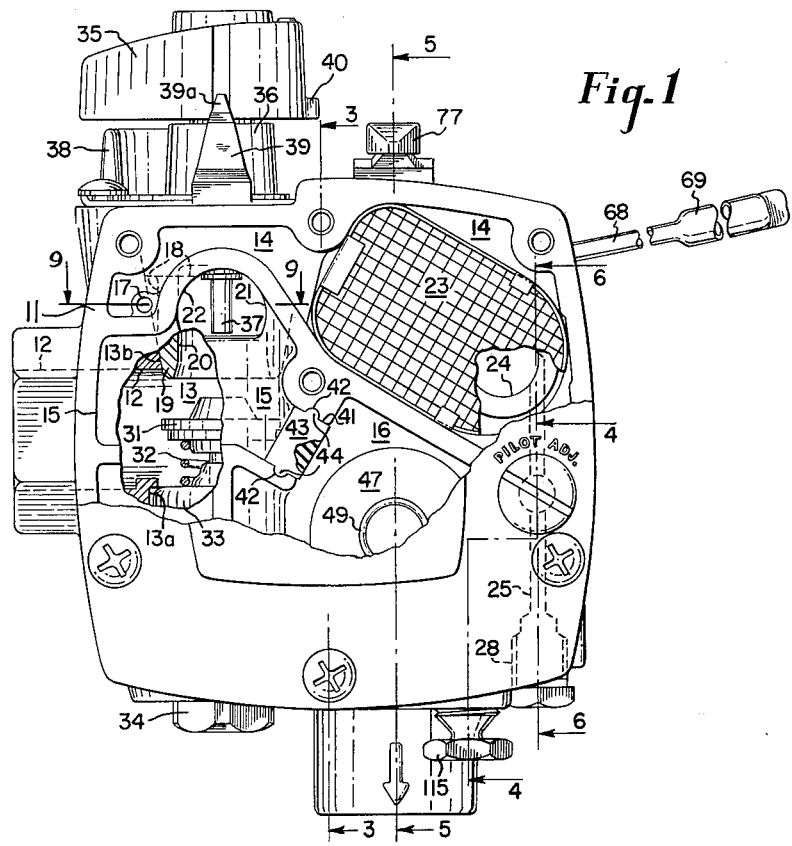
FIGURE 1 is an elevational view of the manifold valve with portions thereof broken away.

As can best be seen in FIGURE 1 of the drawing, the main valve body 11 has an inlet opening 12 that communicates with a vertically extending, stepped bore 13 having an enlarged diameter portion 13a at its lower end and a conical bore 13b at its upper end. Extending inwardly from the front face of the valve body are three recesses 14, 15, and 16 which, with the member covering said recesses, form gas chambers for the conduction of gas through the valve body. The recess 14 has a bore 17 extending from the bottom thereof tangentially into the conical bore 13b and in registration with an arcuate groove 18 formed in the periphery of a plug valve 19 rotatably mounted in the conical bore 13b. The groove extends a quarter of the way around the plug valve.

The plug valve is resiliently held in the conical bore by means of conventional mounting means for such valves so will not be described in detail herein.

The plug valve 19 has an axial bore 20 therein which communicates at its open end with an unoccupied portion of the bore 13 and has a radial opening 21 therein which registers with an opening 22 through the bottom of the recess 15 when the plug valve is in its open position. One end of the groove 18 terminates in the opening 21. It is thus seen that the gas can flow through the inlet 12 into the bore 13 axially into the bore 20 and laterally through the openings 21 and 22 into the chamber or recess 15. Also, gas can flow from the opening 21 through the arcuate groove 18 to the bore 17 and into the recess 14. It is to be noted that the recess 14 extends from the bore 17 to the other side of the plug valve into a larger portion of the recess 14 in which is located a filter 23. The filter covers a recess 24 extending inwardly from the bottom of the recess 14 and communicates with a bore 25 extending tangentially from the bottom of the recess 24 to a pilot gas adjusting screw valve 26 threaded into a bore 27 intersecting the bore 25 and beyond said adjusting valve to a threaded outlet 28 adapted to be connected to a pilot burner. A plug 29 is screw threaded into the outer end of the bore 27 to seal said bore against gas leakage. To prevent leakage of gas past the filter 23, a rubber gasket 30 is positioned around the recess 24 so the gas entering the chamber or recess 14 must of necessity pass through the filter before flowing to the pilot burner outlet.

To prevent gas flowing to a main burner through the plug valve and the main gas outlet 21—22, a safety valve 31 of conventional construction is positioned in the chamber 13 and axially slidable of the plug valve into and out of engagement with the open end of the plug valve. The valve 31 is normally biased into seating engagement with the plug valve by means of a compression spring 32 but is held in its open position, as seen in FIGURE 1, by means of a conventional electro-magnetic unit 33 mounted in a conventional way in the bore portion 13a in a conventional manner. The magnet unit 33 has an internally threaded connector 34 at its outer end which serves as the means for holding the magnet unit in the valve body as well as providing a terminal for the connection of a concentric lead type of thermocouple unit that is adapted to be heated by the pilot burner connected to the outlet 28. It is thus seen that if the pilot burner flame becomes extinguished, the magnet unit will become de-energized permitting the valve 31 to close on the end of the plug valve cutting off the flow of gas to both the main burner and the pilot burner.

The valve 31 is adapted to be moved to its open position only by means of the knob 35 non-rotatably but axially slidably connected to the valve stem 36 of the plug valve. The knob carries at its inner end, a reset stem 37 which moves into engagement with the valve 31 as the knob 35 is moved axially inwardly in the pilot position of the plug valve. An abutment 38 prevents the inward movement of the knob 35 in the "on" or open position of the plug valve. A combined pointer and abutment 39 is engaged by an arcuate projection 40 on the knob 35 in the pilot and "off" position of the plug valve. In order to move the plug valve from the pilot position to the "off" position or from the "off" position to the pilot position, the knob must first be depressed slightly to position it below the pointer portion 39a so that it can pass thereunder in its movement from one to the other position. This will prevent accidental turning on of the gas from the "off" position of the valve and the accidental turning off of the gas from the pilot position when it is really desired that the gas be turned to the "on" position.

Extending from the recess 15 to the recess 16 is a rectangular channel portion 41 having a pair of grooves 42 extending from the outer surface of the body 11 to the bottom of the channel between the chambers 15 and 16. Removably mounted in this channel, as illustrated in FIGURE 1 of the drawing, is a rectangular rubber wall or dam 43 having a pair of ribs 44 thereon which snugly fit in the grooves 42 in the side walls of the channel. The dam is made slightly deeper than the depth of the channel so that when a cover member is secured to the face of the valve body, the rubber will be compressed sufficiently to give a tight seal around its periphery to prevent the leakage of gas from chamber 15 to chamber 16. This dam is used only when it is desired to add to or initially assemble the valve with the pressure regulator unit illustrated in cross section in FIGURE 3 of the drawing. Otherwise, if the pressure regulator section is not desired, the dam is not used and a cover member 45 is positioned over the body 11 with a sealing gasket 46 therebetween to thus enable gas to flow from chamber 15 to chamber 16.

Located in the recess 16 is a thermostatic valve 47 that is normally biased into seating engagement with an annular valve seat 48 by means of a coil compression spring 49 positioned between the valve and a spring retaining boss 80b on a web 80a across recess 82a (FIG. 8). The valve seat 48 surrounds a reduced diameter bore 50 which has a transverse opening therein which communicates with the threaded outlet 51 adapted to be connected to a main burner.

Valve 47 is adapted to be actuated by a snap acting mechanism positioned in a step bore 52 extending inwardly from the other side of the valve body to the bores 16 and 15. The valve stem 53 is adapted to be actuated by a plurality of pivoted fingers 54 bearing against a washer shaped snap disc 55, with the fingers 54 being actuated by an annular movable fulcrum member 56. The fulcrum member 56 bears against a thin metal diaphragm 57 which in turn bears against an actuator button 58 extending through a base plate 59 positioned over the step bore 52. Button 58 extends through an opening 60 in the plate 59 and bears against a lever 61. The lever 61 is pivoted at one of its ends to an adjustable fulcrum lever 62 by means of a pivot 63 while the other end of the lever 61 carries a cup-shaped member 64 in an opening 65 therein. Positioned in the cup-shaped member is a liquid filled bellows 66 that bears at one of its ends against the bottom of the cup-shaped member and at its other end against the bottom of an indented portion 67 of the plate 59. The bellows is connected by a capillary tube 68 to a liquid filled bulb 69 that is adapted to sense temperature to expand and contract the bellows to cause actuation of the lever which, in turn, causes actuation of the valve.

Lever 62 is connected at its other end by means of a fixed pivot 70 to a housing 71 which is secured through the valve body 11 by means of bolts 72 extending through the housing and through the plate 59 into threaded bores (not shown) in the valve body.

Figure 2:
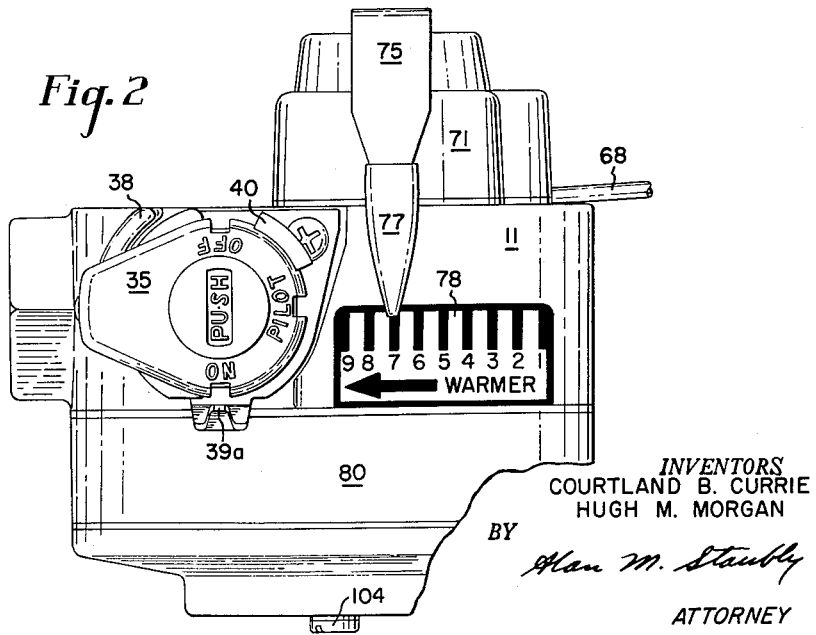
FIGURE 2 is a plan view of the manifold valve with a portion thereof broken away.

Extending through a threaded bore 73 in the housing 71, between the pivots 70 and 63 is a threaded adjusting screw 74 which bears at its inner end against the lever 62 to variably position the pivot 63 to vary the control point at which the valve is actuated. The adjusting screw 74 has a generally L-shaped manually adjustable lever 75 secured thereto by means of a screw 76. The lever 75 carries at its free end a pointer 77 which is adapted to cooperate with a scale plate 78 secured to the top of the valve body, as shown in FIGURE 2 of the drawing.

Figure 5:
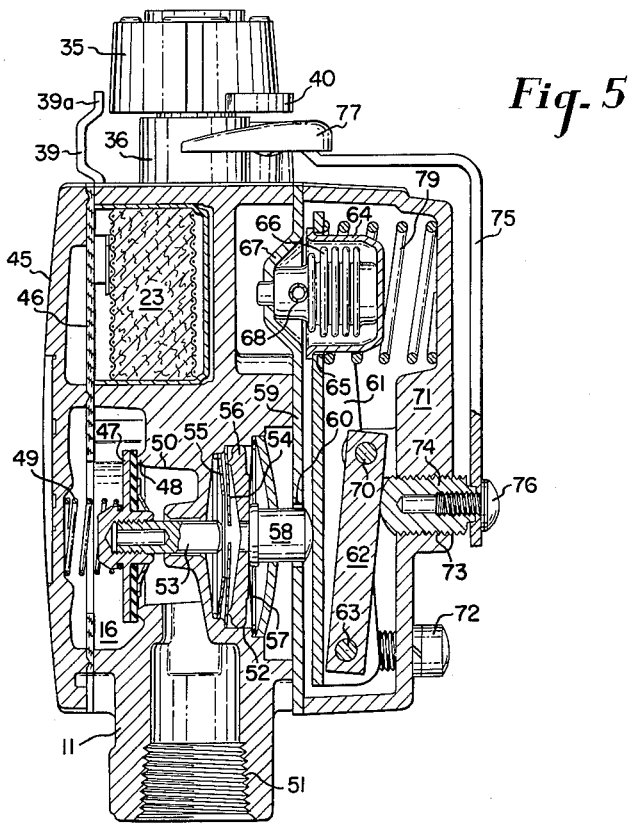
FIGURE 5 is a vertical sectional view of the manifold valve taken along line 5—5 of FIGURE 1 and with the pressure regulator section thereof removed and a cover plate substituted therefor.
Figure 6:
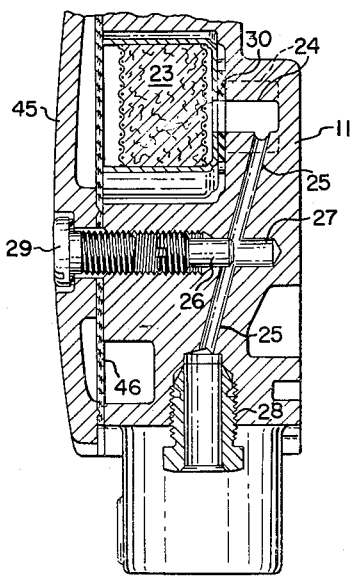
FIGURE 6 is a fragmentary sectional view of the manifold valve illustrated in FIGURE 5 and taken along line 6—6 of FIGURE 1.

The valve of this invention may be made and installed in a heating system in the form that it is illustrated in FIGURES 5 and 6 of the drawing. However, if it is desired to add a pressure regulator to the system after it has been installed, or if it is desired to add the pressure regulator at the time of manufacture, the cover 45 may be removed from the assembly illustrated in FIGURES 5 and 6 and the pressure regulator section 80 (FIGURE 3) and its cover 81 may be substituted therefor after the dam 43 (FIGURE 1) has been inserted to block communication between recesses 15 and 16.

The regulator valve section 80 has a stepped bore 82 formed in one face thereof which provides a large diameter recess 82a and a smaller diameter recess 82b which are separated by a valve seat member 83 fitted in the opening of the recess 82b. An opening or recess 84 through the bottom of the recess 82a communicates with the recess 16 surrounding the thermostatic valve 47. The recess 82b communicates through a transverse opening 85 in the wall thereof with a recess 86 formed in the other face of the section 80. This recess 86 registers with the recess 15 in the valve body 11. It is thus seen that gas will flow from the plug valve through recess 15, recess 86 and through the pressure regulator valve seat to the recess 82a, through opening 84 and through the recess or chamber 16 over the thermostatic valve when the regulator valve section 80 is added to the valve assembly. A diaphragm 87 extends across the recess 82 and is clamped thereto by means of bolts 88 extending through the cover plate 89 and a sealing gasket 90. A pressure regulator valve 91 has a stem 92 that extends through the diaphragm and two backing plates 93 and 94 and is secured thereto by means of a nut 95 threaded onto the stem 92 clamping the two backing plates and diaphragm between it and an abutment shoulder 96 on the valve stem.

Figure 3:
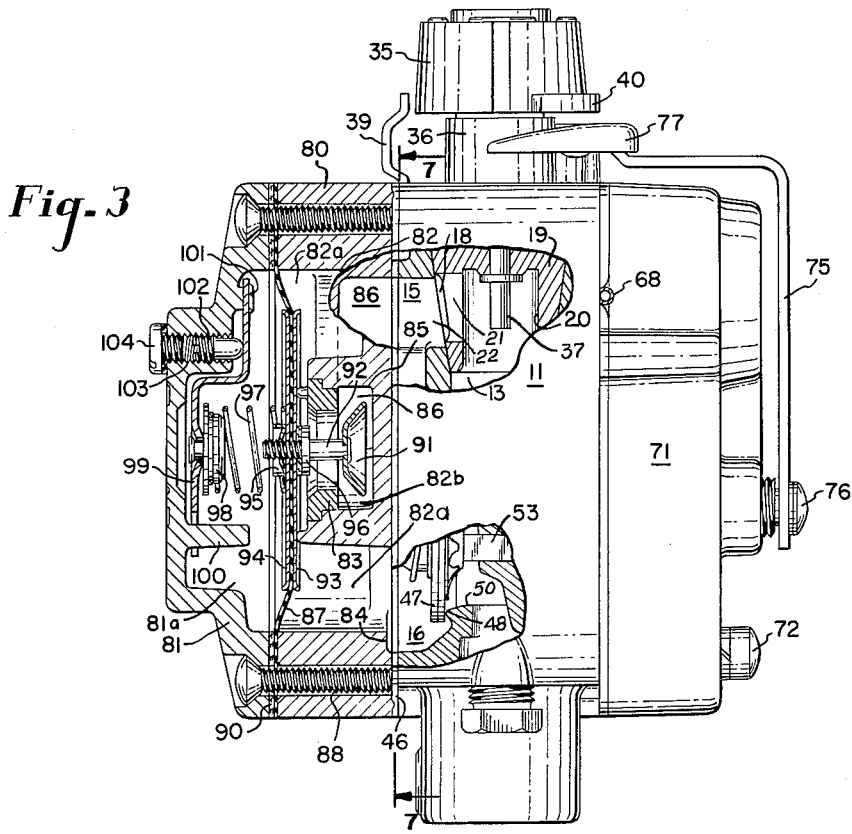
FIGURE 3 is a side elevational view of the manifold valve with the pressure regulator section thereof shown in cross section taken along the line 3—3 of FIGURE 1.
Figure 4:
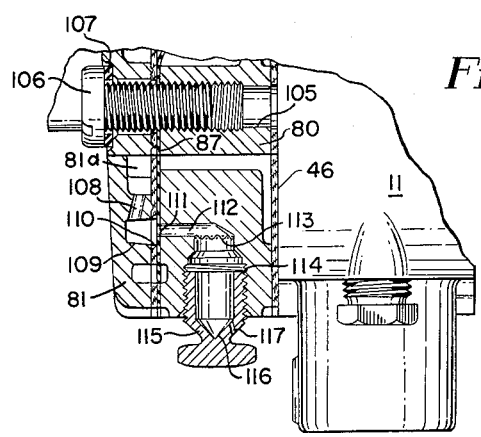
FIGURE 4 is a fragmentary sectional view taken along the line 4—4 of FIGURE 1.

The diaphragm and the regulator valve are normally biased to their valve opened positions, as illustrated in FIGURE 3 of the drawing, by means of a coil compression spring 97 that extends between the backing plate 94 and a spring retainer 98 mounted on the movable end of a lever 99. The lever 99 has a forked end which straddles a guide boss 100 and is pivoted at its other end by a headed over boss 101 extending through a hole in that end of the lever.

The loading of the spring 97 is adjustable by means of a pivot screw 102 adjustably threaded in a threaded bore 103 near the pivoted end of the lever 99. The bore 103 is sealed against gas leakage by means of a threaded plug 104.

The cover plate 81 of the pressure regulator is also provided with a threaded bore 105 which registers with the bore 27 in the valve body 11 to enable the pilot gas to be adjusted in the same way as the assembly illustrated in FIGURE 6. To prevent gas leakage past the pilot valve 26, a threaded plug 106 is threaded into the bore 105 with a sealing gasket 107 between it and the cover 81.

The chamber 81a within the cover 81 is connected to the atmosphere through a bore 108 extending from said chamber to a bore 109 registering with an opening 110 in the gasket, a hole 111 in the diaphragm 87, a registering bore 112 in the valve section 80 a screen 113 positioned in the bottom of a threaded bore 114, extended at right angles from the bore 112 to the exterior of the valve section 80, and a leak limiter plug 115 threaded into the bore 114. The leak limiter has an axial bore 116 with a very small bore 117 extending from the inner end thereof to the exterior of the limiter. The function of the opening 117 is to prevent rapid escape of gas from the pressure regulator in the event the diaphragm 87 should rupture. The opening 117 also serves the function of dampening the operation of the diaphragm by permitting only a slow rate of air flow into and out of the chamber between the diaphragm and the cover 89.

*Operation*

Assuming that the above described valve is assembled or installed in a heating system without the pressure regulator and the dam 43, the assembly illustrated in FIGURE 5, and with the plug valve in its "off" position, the system may be placed in operation by depressing the control knob 35 slightly to enable the arcuate abutment member 40 to pass under the pointer 39a, rotating the knob to the pilot position, depressing the knob axially to bring the reset stem 37 into engagement with the valve 31 and to lift it off of the plug valve and to reset the armature (not shown) in the electro-magnetic unit 33 against the magnet (not shown) also in said unit and then lighting the pilot burner (not shown), the gas flowing to the pilot burner from the inlet 12 to the plug valve and the gas passages described above. When the thermocouple (not shown) connected to the electro-magnet unit 33 has become sufficiently heated to hold the valve 31 in its opened position, the knob 35 may be released and then turned to the on position thereof to permit the flow of made gas through the plug valve and the passages mentioned above.

Should the temperature around the bulb 69 drop sufficiently to cause the bellows 66 to contract, the spring 79 will pivot the lever 61 to operate the snap acting mechanism in a direction to open the valve 47.

If it is later found that the heating system needs pressure regulation, it is a simple matter to remove the cover 45, insert the dam 43 and then add the pressure regulator section 80 and its cover 81.

The assembly including the pressure regulator is placed in operation in the same manner as the assembly disclosed in FIGURE 5. It is to be noted however that with this arrangement, the pressure regulator is positioned between the plug valve-safety valve combination and the thermostatic valve which is a very desirable arrangement. With the thermostatic valve closed, pressure will be built up between it and the pressure regulator diaphragm so as to cause the pressure regulator valve to move to its substantially closed position. Then upon a call for heat, when the thermostatic valve snaps open, there will not be a full rush of gas to the burner but rather a less than full flow due to the fact that the pressure regulator valve will open more slowly. This operation provides a much more satisfactory ignition of the main burner.

Should it be desirable to cut off the gas to the main burner only, the knob would be rotated to the pilot position thereof where the abutment or projection 40 on the knob would strike the pointer 39a and prevent accidental turning off of the pilot gas also, which would result in the necessity of re-igniting the pilot burner. The pointer thus provides a dual function of indicating the position of the manually operable control valve as well as preventing accidental turning on of gas or turning off the gas.

While it is obvious that various modifications may be made of this invention, without departing from the spirit thereof, it is to be understood that the scope of the invention is to be determined from the appended claims.

We claim as our invention:

1. A manifold valve comprising a valve body having an inlet and a main outlet and a pilot outlet, a plug valve between said inlet and said outlets, a safety valve between said inlet and said plug valve, said plug valve having passages therein for conducting gas from said inlet to said outlets, said plug valve being movable between "off" and "pilot" and "on" positions, means for moving said safety valve to its open position, a knob for turning said plug valve, said means being arranged to be actuated by movement of said knob when the plug valve is in its pilot position, a pointer on said valve body for indicating the position of said plug valve, said pointer having an outwardly bowed portion intermediate its ends, and an abutment on said knob so positioned as to engage the outer end of said pointer in the "off" and "pilot" positions of said plug valve and movable axially with said knob to align said abutment on said knob with said outwardly bowed portion to permit turning of said knob past said pointer.

2. The combination comprising a valve body, a rotary plug valve in said body, said plug valve being movable between "off," "pilot" and "on" positions in that sequence, a second valve for controlling fluid flow through said plug valve when the plug valve is open, means responsive to a pilot burner flame for holding said second valve open and for causing said second valve to close upon flame failure, a knob for rotating said plug valve and axially movable with respect thereto to effect movement of said second valve to its "open" position, means positioned to prevent sufficient axial movement of said knob to open said second valve when the plug valve is in its "on" position, an abutment on said knob and abutment means on said valve body cooperable therewith to permit rotary movement of the knob freely between "on" and "pilot" positions but requiring slight axial and then rotary movement of said knob to move the knob to and from its "off" position.

3. The combination of claim 2 wherein said abutment means on said body serves as a pointer to indicate the valve's position.

4. The combination comprising a valve body, a rotary plug valve in said body, said plug valve being movable between "off," "pilot" and "on" positions, a second valve for controlling fluid flow through said plug valve when the plug valve is open, thermoelectric means responsive to a pilot burner flame for holding said second valve open and for causing said second valve to close upon flame failure, a knob for rotating said plug valve and axially movable with respect thereto to effect movement of said second valve to its "open" position, means positioned to prevent sufficient axial movement of said knob to open said second valve when the plug valve is in its "on" position, an abutment rotatable with said knob and abutment means on said valve body cooperable therewith to permit rotary movement of the knob freely between "on" and "pilot" positions but requiring slight axial and then rotary movement of said knob to move the knob to and from its "off" position.

References Cited in the file of this patent

UNITED STATES PATENTS

| | | |
|---|---|---|
| 2,403,611 | Ray | July 9, 1946 |
| 2,587,480 | Johnson et al. | Feb. 26, 1952 |
| 2,735,439 | Coffey | Feb. 21, 1956 |
| 2,743,871 | Heiser et al. | May 1, 1956 |

FOREIGN PATENTS

| | | |
|---|---|---|
| 61,491 | Denmark | Oct. 18, 1943 |